US008443761B2

(12) United States Patent
Keil

(10) Patent No.: US 8,443,761 B2
(45) Date of Patent: May 21, 2013

(54) VETERINARY PROCEDURE TABLE WITH SCALE

(75) Inventor: Charles C. Keil, Fort Collins, CO (US)

(73) Assignee: Midmark Corporation, Versailles, OH (US)

( * ) Notice: Subject to any disclaimer, the term of this patent is extended or adjusted under 35 U.S.C. 154(b) by 579 days.

(21) Appl. No.: 11/760,432

(22) Filed: Jun. 8, 2007

(65) Prior Publication Data
US 2007/0245977 A1   Oct. 25, 2007

Related U.S. Application Data

(60) Continuation-in-part of application No. 11/431,744, filed on May 10, 2006, now Pat. No. 7,428,882, which is a continuation of application No. 10/760,774, filed on Jan. 20, 2004, now Pat. No. 7,073,461, and a continuation-in-part of application No. 11/671,611, filed on Feb. 6, 2007, now Pat. No. 7,827,922, which is a continuation of application No. 10/224,247, filed on Aug. 19, 2002, now abandoned, which is a continuation of application No. 09/639,033, filed on Aug. 14, 2000, now Pat. No. 6,435,110, which is a division of application No. 09/215,568, filed on Dec. 16, 1998, now Pat. No. 6,101,956.

(60) Provisional application No. 60/069,720, filed on Dec. 30, 1997.

(51) Int. Cl.
*A01K 15/04* (2006.01)

(52) U.S. Cl.
USPC ......................................................... 119/753

(58) Field of Classification Search
USPC ................. 119/753, 600, 665, 673, 722, 754, 119/757, 755, 756, 842
See application file for complete search history.

(56) References Cited

U.S. PATENT DOCUMENTS

| 859,696 A | 7/1907 | Schmidt |
| 1,900,255 A | 3/1933 | Ormsbee |
| 2,460,857 A | 2/1949 | Sweat |
| 2,471,140 A | 5/1949 | Breth |

(Continued)

FOREIGN PATENT DOCUMENTS

| EP | 0 293 760 A2 | 12/1988 |
| FR | 2 670 097 A1 | 6/1992 |
| GB | 981280 | 1/1965 |
| JP | 2003180184 A * | 7/2003 |

OTHER PUBLICATIONS

"Introducing the No Clog T-Trap", web page of http://www.ttrap.com, dated Jan. 16, 2004.

(Continued)

*Primary Examiner* — Son T Nguyen
(74) *Attorney, Agent, or Firm* — Wood, Herron & Evans, LLP

(57) ABSTRACT

A veterinary procedure table includes an animal support upon which an animal may be placed during the performance of a veterinary procedure. A sink associated with the animal support is adapted to receive fluid material that may be generated during the performance of the veterinary procedure and to direct the fluid material away from the animal support. The veterinary procedure table further includes at least one sensor for sensing a load disposed on the animal support, and a display communicating with the sensor to indicate a weight associated with the sensed load.

19 Claims, 4 Drawing Sheets

U.S. PATENT DOCUMENTS

| | | | |
|---|---|---|---|
| 2,630,099 A | 3/1953 | Voight | |
| 2,663,929 A | 12/1953 | Carpenter | |
| 3,208,432 A | 9/1965 | Fisk | |
| 3,302,022 A | 1/1967 | Brenner et al. | |
| 3,330,258 A | 7/1967 | Rosenberg | |
| 3,473,173 A | 10/1969 | Maciulaitis et al. | |
| 3,486,175 A | 12/1969 | Schwartz | |
| 3,608,462 A | 9/1971 | Groshong | |
| 3,633,901 A | 1/1972 | Lindquist | |
| 3,694,830 A | 10/1972 | Koller | |
| 3,797,819 A | 3/1974 | Platz et al. | |
| 3,810,263 A | 5/1974 | Taylor et al. | |
| 3,965,501 A * | 6/1976 | Bucher | 5/604 |
| 3,971,538 A | 7/1976 | Marvich | |
| 4,029,094 A | 6/1977 | Winicki | |
| 4,073,240 A | 2/1978 | Fly | |
| 4,103,373 A | 8/1978 | Luedtke et al. | |
| 4,113,219 A | 9/1978 | Mieyal | |
| 4,170,961 A | 10/1979 | Rosenberg et al. | |
| 4,195,829 A | 4/1980 | Reser | |
| 4,340,012 A | 7/1982 | Gustafson | |
| 4,393,969 A | 7/1983 | Woell | |
| 4,454,628 A | 6/1984 | Olson | |
| 4,544,214 A | 10/1985 | Nizel et al. | |
| RE32,052 E | 12/1985 | Rosenberg et al. | |
| 4,558,847 A | 12/1985 | Coates | |
| 4,572,493 A | 2/1986 | Hubert | |
| 4,578,833 A | 4/1986 | Vrzalik | |
| 4,793,428 A | 12/1988 | Swersey | |
| 4,836,144 A | 6/1989 | Cole | |
| 4,872,657 A | 10/1989 | Lussi | |
| 4,885,998 A | 12/1989 | Span et al. | |
| 4,912,754 A | 3/1990 | Van Steenburg | |
| 5,050,253 A | 9/1991 | Wasek | |
| 5,156,166 A | 10/1992 | Sebring | |
| 5,186,337 A | 2/1993 | Foster et al. | |
| 5,224,680 A | 7/1993 | Greenstein et al. | |
| 5,230,109 A | 7/1993 | Zaccai et al. | |
| 5,230,112 A * | 7/1993 | Harrawood et al. | 5/607 |
| 5,244,433 A | 9/1993 | Utterback | |
| 5,269,030 A | 12/1993 | Pahno et al. | |
| 5,271,113 A | 12/1993 | White | |
| 5,305,481 A | 4/1994 | Nebb | |
| 5,443,017 A | 8/1995 | Wacker et al. | |
| 5,526,823 A | 6/1996 | Wheeler et al. | |
| 5,528,782 A | 6/1996 | Pfeuffer et al. | |
| 5,662,069 A | 9/1997 | Smith | |
| 5,715,548 A | 2/1998 | Weismiller et al. | |
| 5,794,570 A | 8/1998 | Foster et al. | |
| 5,802,640 A * | 9/1998 | Ferrand et al. | 5/617 |
| 5,826,286 A | 10/1998 | Cranston | |
| 5,862,549 A | 1/1999 | Morton et al. | |
| 5,867,847 A | 2/1999 | Klawitter et al. | |
| 5,888,190 A | 3/1999 | Meyer et al. | |
| D410,084 S | 5/1999 | Tumey et al. | |
| 5,903,940 A | 5/1999 | Volker | |
| 5,927,745 A | 7/1999 | Cunningham | |
| 5,940,911 A | 8/1999 | Wang | |
| 6,089,242 A | 7/2000 | Buck | |
| 6,101,956 A | 8/2000 | Keil | |
| 6,155,439 A | 12/2000 | Draughn | |
| D439,670 S | 3/2001 | Sommer | |
| 6,230,657 B1 | 5/2001 | Read | |
| 6,279,510 B1 | 8/2001 | Batterton | |
| 6,282,736 B1 | 9/2001 | Hand et al. | |
| 6,435,110 B1 | 8/2002 | Keil | |
| 6,467,112 B1 | 10/2002 | Cheng | |
| 6,471,167 B1 | 10/2002 | Myers et al. | |
| 6,477,725 B1 | 11/2002 | Hong et al. | |
| 6,484,334 B1 | 11/2002 | Borders et al. | |
| 6,499,160 B2 | 12/2002 | Hand et al. | |
| 6,553,943 B1 | 4/2003 | Murphy | |
| 6,575,653 B1 | 6/2003 | Krauter | |
| 6,658,680 B2 | 12/2003 | Osborne et al. | |
| 6,691,347 B2 * | 2/2004 | Hand et al. | 5/607 |
| 6,711,757 B2 | 3/2004 | Peck | |
| 6,788,018 B1 | 9/2004 | Blumenkranz | |
| 6,804,581 B2 | 10/2004 | Wang et al. | |
| 6,904,621 B2 | 6/2005 | Otto et al. | |
| 6,912,959 B2 | 7/2005 | Kolody et al. | |
| 6,933,695 B2 | 8/2005 | Blumenkranz | |
| 7,032,840 B2 | 4/2006 | Freidell | |
| 7,073,464 B2 | 7/2006 | Keil | |
| 2003/0024485 A1 | 2/2003 | Freidell | |
| 2006/0201448 A1 | 9/2006 | Keil | |
| 2007/0125314 A1 | 6/2007 | Keil | |
| 2007/0245977 A1 | 10/2007 | Keil | |

OTHER PUBLICATIONS

Veterinary Economics, vetguide.com Illustrated Buyer's Guide to New Equipment and Supplies,Wet Lift Table, web page of http://vetguide.ims.ca, dated Sep. 19, 2005.

European Patent Office; Search Report and Written Opinion in European Patent Application No. EP09251081 dated Jul. 23, 2009.

Fairbanks Scales Inc., Fairbanks Vet Scale Operating/User Manual, Issue #2, dated Mar. 2004.

* cited by examiner

VETERINARY PROCEDURE TABLE WITH SCALE

The present application claims priority to U.S. patent application Ser. No. 11/431,744, filed May 10, 2006, which is a continuation of U.S. patent application Ser. No. 10/760,774, filed Jan. 20, 2004, now U.S. Pat. No. 7,073,464. This application also claims priority to U.S. patent application Ser. No. 11/671,611, filed Feb. 6, 2007, which is a continuation of U.S. patent application Ser. No. 10/224,247, filed Aug. 19, 2002, which is a continuation of U.S. patent application Ser. No. 09/639,033, filed Aug. 14, 2000, now U.S. Pat. No. 6,435,110, which is a divisional of U.S. patent application Ser. No. 09/215,568, filed Dec. 16, 1998, now U.S. Pat. No. 6,101,956, which claims priority to U.S. Provisional Patent Application Ser. No. 60/069,720, filed Dec. 30, 1997.

TECHNICAL FIELD

The present invention relates to tables for examining and performing procedures on animals, and more particularly to a veterinary procedure table with a built-in scale.

BACKGROUND

Veterinary examination and procedure tables are known in the art and are convenient for supporting pets and other animals during examination and treatment. Many veterinary tables have a fixed-height animal support surface. Because the height of the animal support surface cannot be adjusted, it is difficult to lift large animals onto the support surface of fixed-height examination tables, particularly after the animal has been anesthetized. Other veterinary examination tables have adjustable-height animal support surfaces, but these generally include some type of support structure directly beneath the table that limits the minimum height to which the table can be adjusted above the floor surface. Moreover, support structure located directly beneath the table may impede the ability of practitioners to draw close to the table while in a seated position.

During certain procedures such as cutting and trimming of hair and nails, administering shots, suturing wounds, or performing dental work, it may be desired to collect fluid materials discharged from the animal or otherwise used during the procedure and to direct these fluids away from the animal support surface to an appropriate drain. For example, the treatment of wounds, the performance of surgery, or various other veterinary procedures may require irrigation or washing of the animal which generates fluids that should be directed away from the animal support surface. Accordingly, veterinary examination or treatment tables may be provided with a sink, or basin, adapted to collect fluids generated during treatment and to direct these fluids to an appropriate drain. Conventional wet procedure tables, however, are not generally configured for height adjustment.

Prophylactic cleaning and various other dental treatments are becoming increasingly popular, particularly for pets. Such dental procedures necessarily require the use of fluids for washing and irrigation, as discussed above. Moreover, animals undergoing dental treatment are usually anesthetized to facilitate treatment. For proper administration of anesthesia, the weight of the animal must be known. Typically, veterinary practitioners must weight the animal using a separate scale before placing the animal on the treatment table. The extra time and effort required to separately weigh the animal prior to treatment and place the animal on the procedure table increases the time required for treatment and therefore reduces the number of treatments which can be conducted on a given day. The time and effort required to treat a single animal is increased if the height of the procedure table is fixed.

In certain emergency situations, such as when an animal has been hit by a car, time is of the essence to ensure the best possible treatment of the animal. If the animal must be anesthetized for performance of a medical procedure, the weight of the animal must be determined and the extra time and effort required to separately weigh the animal, as discussed above, only delays treatment of the animal.

A need therefore exists for an improved veterinary procedure table that overcomes these and other drawbacks of the prior art.

SUMMARY

The present invention overcomes the foregoing and other shortcomings and drawbacks of veterinary procedure tables heretofore known for use in examining or treating animals. While the invention will be described in connection with certain embodiments, it will be understood that the invention is not limited to these embodiments. On the contrary, the invention includes all alternatives, modifications and equivalents as may be included within the spirit and scope of the present invention.

In one aspect, a veterinary procedure table includes an animal support upon which an animal may be placed during the performance of a veterinary procedure. A sink associated with the animal support is adapted to receive fluid material that may be generated during the performance of the veterinary procedure and to direct the fluid material away from the animal support. The veterinary procedure table further includes at least one sensor for sensing a load disposed on the animal support, and a display communicating with the sensor to indicate a weight associated with the sensed load.

In one embodiment, the animal support is cantilevered from a vertically extending frame. The animal support is slidably coupled to the frame only at a first end, such that a second end of the animal support extends outwardly from the frame. The first end is slidably coupled to the frame so that the animal support may be selectively moved to a plurality of elevations relative to a floor surface. In another embodiment, the animal support surface may be positioned a fixed height above a floor surface.

BRIEF DESCRIPTION OF THE FIGURES

The accompanying drawings, which are incorporated in and constitute a part of this specification, illustrate exemplary embodiments of the invention and, together with a general description of the invention given above, and the detailed description given below, serve to explain the invention in sufficient detail to enable one of ordinary skill in the art to which the invention pertains to make and use the invention.

DETAILED DESCRIPTION

Figure 1:
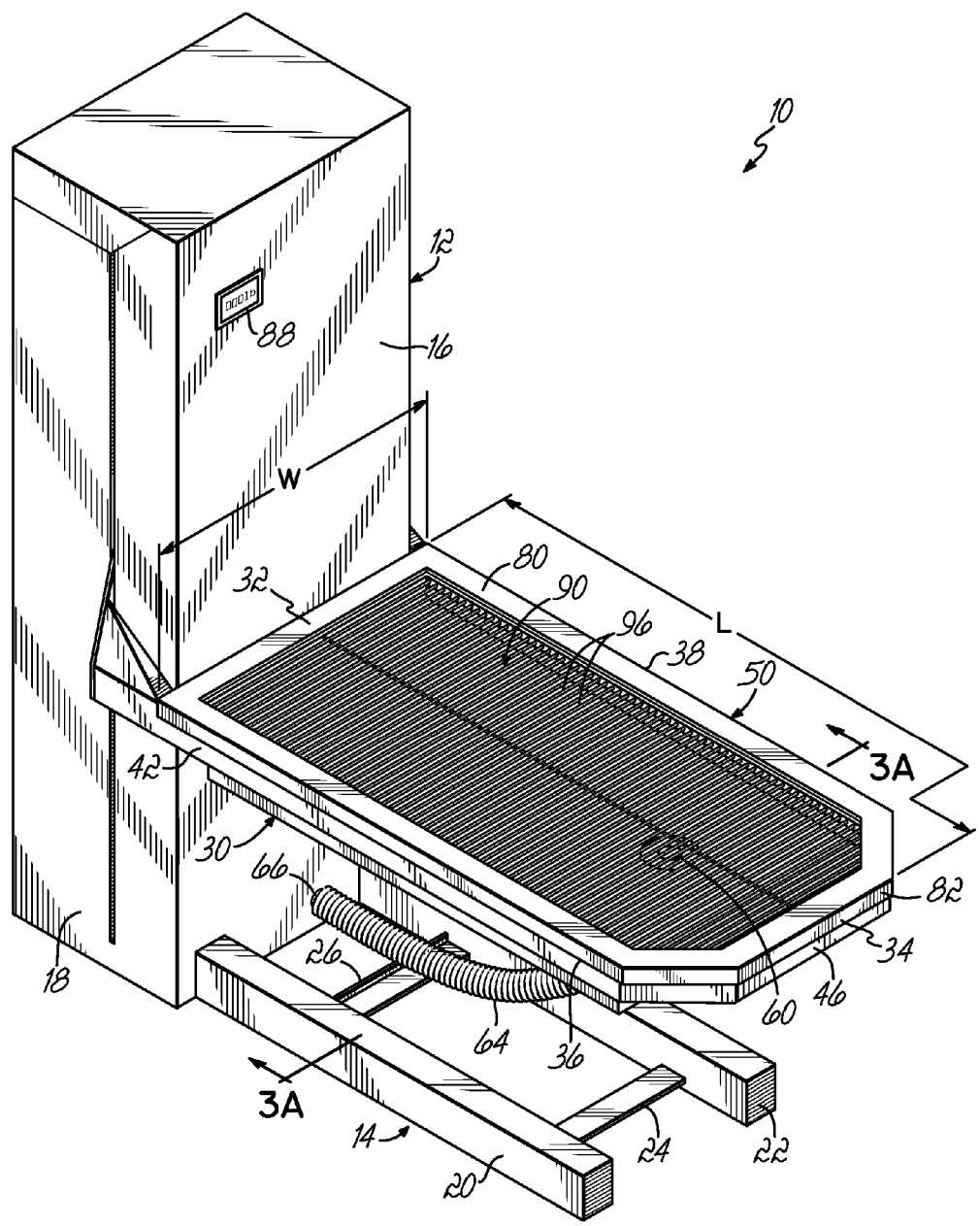
FIG. 1 is a perspective view of an exemplary height-adjustable veterinary procedure table in accordance with the principles of the present invention.
Figure 2:
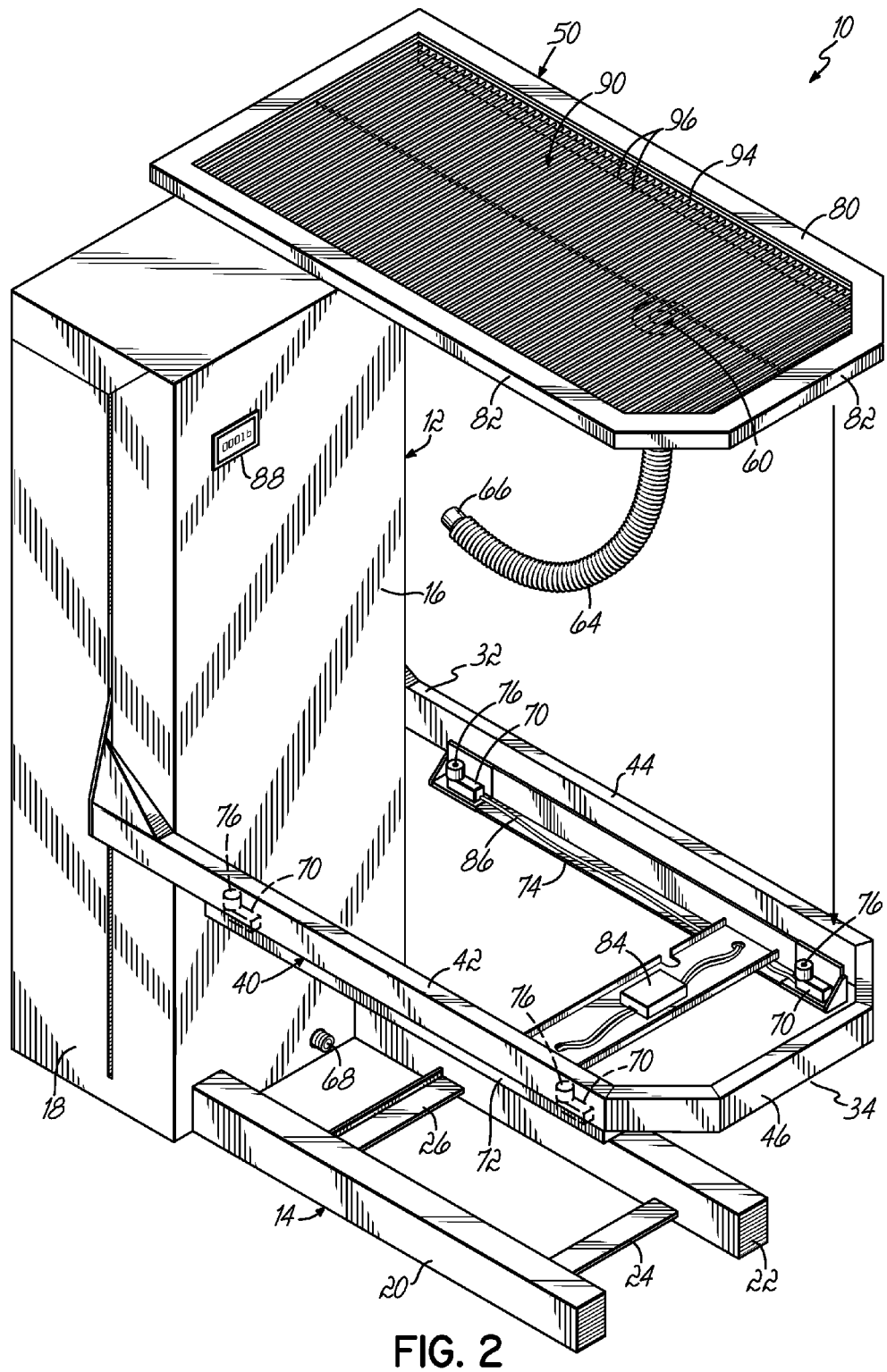
FIG. 2 is an exploded view of the veterinary procedure table of FIG. 1.

FIGS. 1 and 2 depict an exemplary veterinary procedure table 10 in accordance with the principles of the present invention. The veterinary procedure table 10 includes a vertical frame assembly 12 extending generally upwardly from a floor surface, and a base assembly 14 coupled to the vertical frame assembly 12 at a lower end thereof. The vertical frame assembly 12 includes a structural frame (not shown) housed within an enclosure comprising a front cover 16 and a rear cover 18. The vertical frame assembly 12 is generally described in U.S. Pat. No. 7,073,464 to Keil, and the details of such are not repeated herein. The base assembly 14 includes first and second elongate supports 20, 22 extending outwardly from the vertical frame assembly, and one or more transverse members 24, 26 extending between the supports 20, 22, as described in U.S. Pat. No. 7,073,464. The base assembly 14 extends outwardly from the vertical frame assembly 12 and helps to maintain stability of the veterinary procedure table 10.

The veterinary procedure table 10 further includes an animal support assembly 30 cantilevered outwardly from the vertical frame assembly 12 and slidably coupled to the vertical frame assembly 12 for selective height adjustment relative to the floor surface. In the embodiment shown, the animal support assembly 30 includes first and second spaced ends 32, 34 defining a lengthwise dimension (L), and first and second spaced sides 36, 38 defining a widthwise dimension (W). The lengthwise dimension (L) is greater than the widthwise dimension (W) such that the animal support assembly 30 is cantilevered longitudinally away from the vertical frame assembly 12, with the second end 34 extending outwardly from the vertical frame assembly 12.

The animal support assembly 30 is coupled to the vertical frame assembly 12 only at the first end 32. This arrangement eliminates any support structure directly beneath the animal support assembly 30 and facilitates movement of the animal support assembly 30 to a height that is very close to the floor surface. Moreover, the absence of support structure directly beneath the animal support assembly 30 allows practitioners to be seated adjacent the animal support assembly 30 with their legs extending beneath the animal support assembly 30. Accordingly, the veterinary procedure table conveniently allows practitioners to be seated very close to an animal supported on the animal support assembly 30 during the performance of procedures.

With particular reference to FIG. 2, the animal support assembly 30 includes an animal support frame 40 comprising first and second outwardly extending arms 42, 44 and an end frame member 46 extending between the first and second arms 42, 44 at the second end 34 of the animal support assembly 30 to define a U-shape. The first and second arms 42, 44 are slidably coupled at the first end 32 of the animal support assembly 30 to the vertical frame assembly 12, as described in U.S. Pat. No. 7,073,464.

Figure 3A:
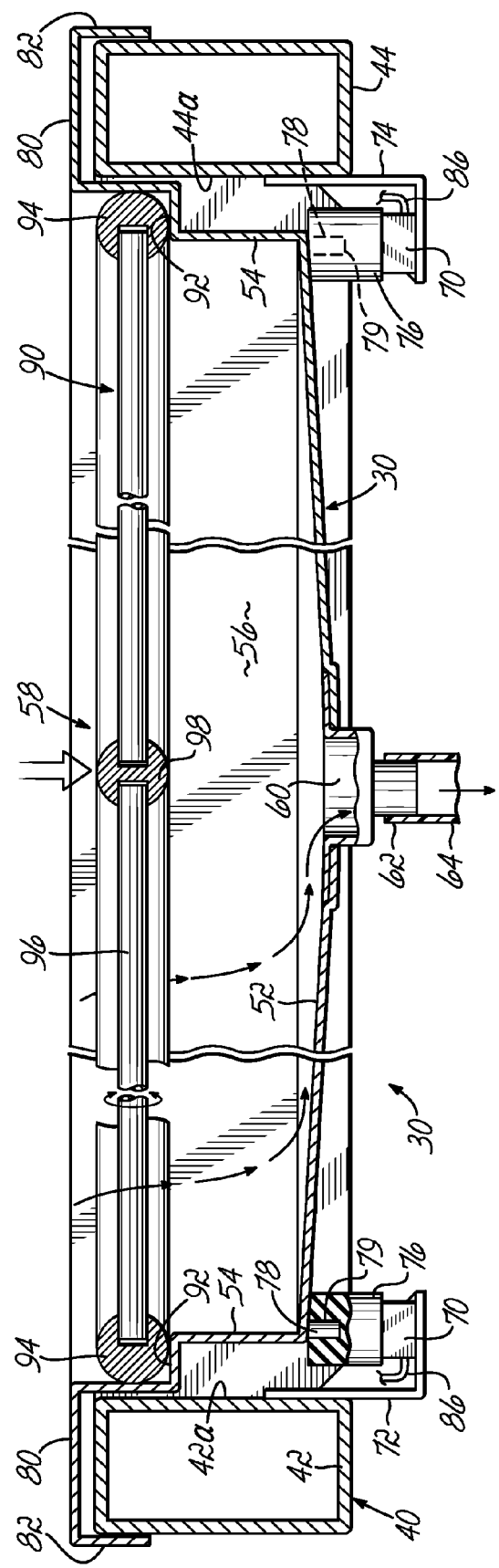
FIG. 3A is a partial cross-sectional view of the veterinary procedure table of FIG. 1, taken along line 3A-3A.
Figure 3B:
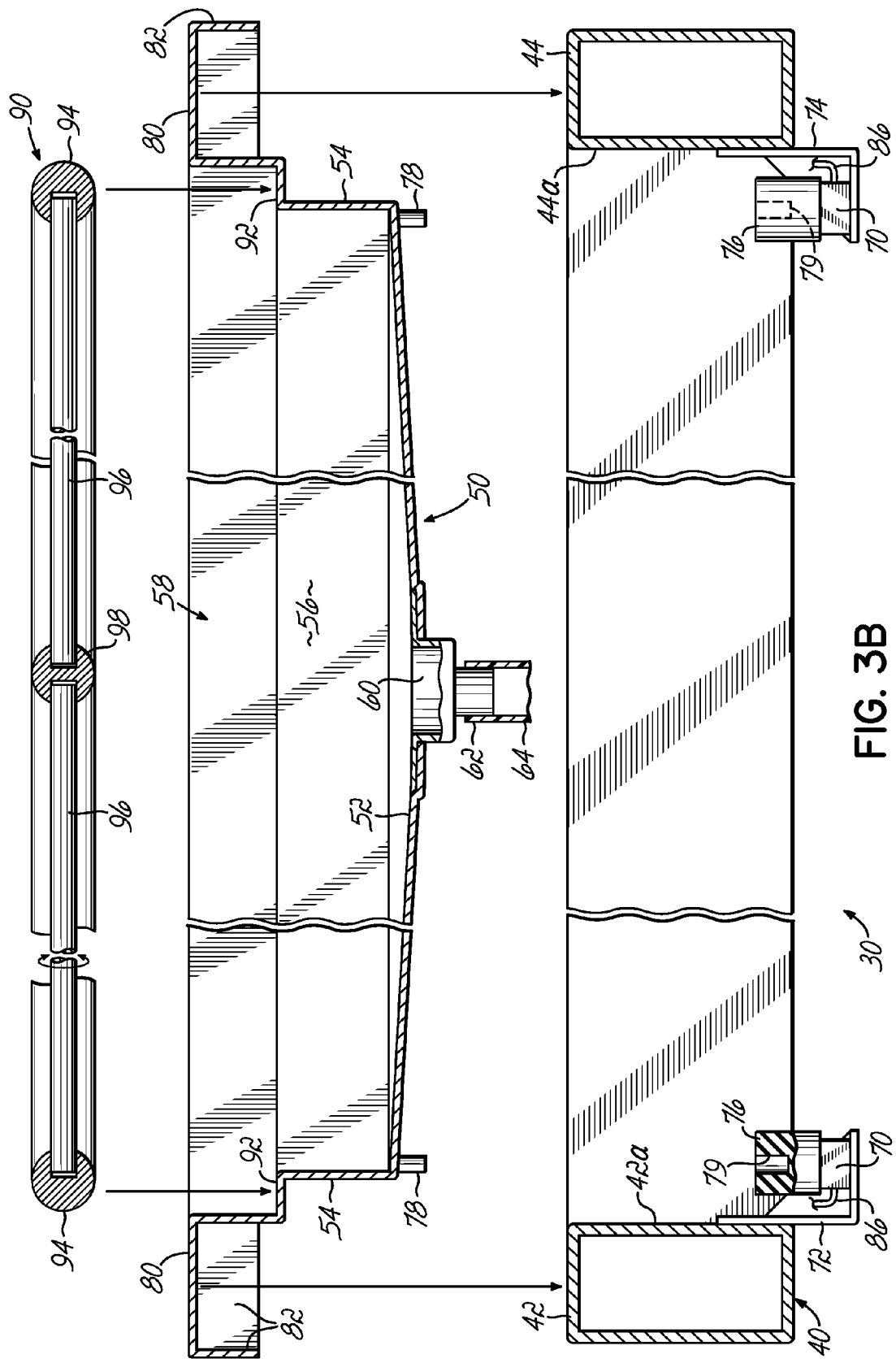
FIG. 3B is an exploded view of the cross-section of FIG. 3A.

With continued reference to FIGS. 1 and 2, and referring further to FIGS. 3A and 3B, the animal support assembly 30 further comprises a sink, or basin 50, removably supported atop the animal support frame 40. The sink 50 is sized and shaped to be received within the animal support frame 40 and includes a bottom wall 52 and one or more sidewalls 54 defining a reservoir 56 with an open, upper end 58. The bottom wall 52 is sloped to direct fluid material received in the reservoir 56 toward a drain 60. The drain 60 may be coupled to the first end 62 of a conduit 64 for removing fluids from the sink 50 and directing the fluids to an appropriate receptacle. In the embodiment shown, the second end 66 of the conduit 64 is coupled to a fluid inlet 68 provided in the vertical frame assembly 12, whereby fluid material from the sink 50 may be pumped to an appropriate waste drain as described in U.S. Pat. No. 7,073,464. It will be appreciated, however, that various other methods and structure suitable for collecting and removing fluid material from the drain 60 of the sink 50 may be used.

With continued reference to FIGS. 2, 3A, and 3B, the bottom wall 52 of the sink 50 is supported on load cells 70 mounted interiorly of the animal support frame 40. The load cells 70 are supported by brackets 72, 74 attached to inwardly facing surfaces 42a, 44a of the first and second support arms 42, 44. Resilient mounting members 76 are disposed between the load cells 70 and the bottom wall 52 of the sink 50 to provide a cushioned mounting while transferring the weight of the sink 50 to the load cells 70. The sink 50, therefore, essentially "floats" relative to the animal support frame 40 while supported on the load cells 70. An exemplary resilient mounting member 76 is Part No. VMB-5000 available from Minor Rubber Company of Bloomfield, N.J.

To facilitate locating the sink 50 within the animal support frame 40, pins 78 are provided on the bottom wall 52 of the sink 50 at locations corresponding to the locations of the load cells 70. Apertures 79 in the resilient mounting members 76 are sized to receive the pins 78 such that proper location of the sink 50 on support frame 40 may be accomplished by fitting the sink 50 onto the support frame 40 with pins 78 inserted into the apertures 79. The upper outer periphery of the sink 50 also includes a peripheral flange 80 that extends outwardly over the top of the animal support frame 40. The peripheral flange 80 includes a downwardly extending lip 82 configured to correspond to the shape of the animal support frame 40, and helps to position the sink 50 within the frame 40 while permitting the sink 50 to float relative to the frame 40 as the sink 50 is supported on the load cells 70.

The load cells 70 are in communication with a control 84 that is configured to receive signals from the load cells 70 and to convert the signals to a weight that may be indicated on a digital display 88 provided on the veterinary procedure table 10 (see FIG. 2). In the embodiment shown, the load cells 70 are electrically coupled to the control 84 by wires 86, but it will be appreciated that the load cells 70 may communicate with the control 84 in various other ways, such as by radio frequency or infrared signals. In the embodiment shown, digital display 88 is provided on the front cover 16 of the vertical frame assembly 12 for convenient viewing by practitioners.

The animal support assembly 30 further includes a grille 90 received within the upper end 58 of sink 50 for supporting an animal directly over the reservoir 56 of the sink 50. In the embodiment shown, a ledge 92 extends around the inner periphery of the sink 50, near the upper end 58, for supporting the grille 90 thereon. The grille 90 comprises outer peripheral frame members 94 and a plurality of spaced transverse rods 96 extending between the frame members 94 for supporting an animal thereon. The grille 90 may further include one or more longitudinal rods 98 extending between the first and second ends 32, 34 of the animal support assembly 30 to help strengthen the grille 90. Because the transverse rods 96 are spaced apart, fluid material from the animal or fluids used during treatment may flow between the rods 96 and into the reservoir 56. The fluid material is then directed along bottom wall 52 to drain 60, whereafter it is removed from sink 50 through conduit 64.

In use, the animal support assembly 30 may be moved to a position close to the floor surface to facilitate placing an animal onto the veterinary procedure table 10. The animal support assembly 30 may thereafter be raised vertically upward to any height desired by the practitioner. The weight of the animal supported on the grille 90 is transferred to the load cells 70 (the static weight of the sink and grille having been zeroed out as described below). The control 84 receives signals from the load cells 70 and calculates the weight of the animal. The control 84 then sends signals to the display 88 to indicate the weight of the animal. The weight of the animal supported on the veterinary procedure table 10 is therefore readily viewable by the practitioner and no separate weighting device is required.

An exemplary controller 84, digital display 88, and load cells 70 are available as a weighing system from Fairbanks Scales of Kansas City, Mo., as Product No. 24135. The controller 84 may be configured to zero the display 88 while the sink 50 and grille 90 are positioned on the load cells 70, such that only the weight of an animal that is later placed on the grille 90 will be indicated on the display 88. The control 84 may also be configured to operate the display 88 in a hold condition, wherein additional weight added to a predetermined weight will not affect the indicated weight of an animal supported on the grille 90. This feature is useful to filter out movement of an animal supported on the animal support assembly 30 and also to filter out additional weight that may be added during the procedure by fluids received in the reservoir 56 of the sink 50.

While the veterinary procedure table 10 has been described herein to include an animal support assembly 30 that is selectively adjustable to various heights, it will be appreciated that the load cells 70, control 84, and display 88 may alternatively be used with a fixed-height veterinary table having a sink for directing fluid material away from an animal support.

While various aspects in accordance with the principles of the invention have been illustrated by the description of various embodiments, and while the embodiments have been described in considerable detail, they are not intended to restrict or in any way limit the scope of the invention to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A veterinary procedure table, comprising:
    a vertically extending frame having a front surface; and
    an animal support having first and second spaced ends defining a lengthwise dimension, and having first and second spaced sides defining a widthwise dimension, said first end defining a terminal edge along said widthwise dimension, said lengthwise dimension being greater than said widthwise dimension; and
    said animal support slidably coupled to said frame only at said first end such that said animal support is cantilevered from said frame, with said terminal edge of said first end confronting said front surface of said frame and said second end extending outwardly from said frame such that a longitudinal centerline of said animal support is perpendicular to said front surface of said frame, and such that said animal support is movable from a first position adjacent to and confronting a floor surface to a plurality of elevations relative to said frame and spaced from the floor surface.

2. The veterinary procedure table of claim 1, wherein said animal support is coupled to said vertically extending frame such that said animal support is fixed in a substantially horizontal orientation relative to said vertically extending frame while being movable to said plurality of elevations.

3. The veterinary procedure table of claim 1, further comprising:
    a sink associated with said animal support and adapted to receive fluid material from said animal support.

4. The veterinary procedure table of claim 3, wherein said animal support comprises a grille disposed directly above said sink.

5. The veterinary procedure table of claim 3, wherein said animal support comprises first and second support arms, and wherein said sink is removably received on said first and second support arms.

6. The veterinary procedure table of claim 1, further comprising:
    at least one sensor associated with said animal support and operative to sense a load disposed on said animal support; and
    a display communicating with said sensor and operative to indicate a weight associated with the load sensed by said sensor.

7. The veterinary procedure table of claim 6, wherein said at least one sensor comprises a plurality of sensors, and wherein said display indicates an average weight value associated with the loads sensed by said sensors.

8. The veterinary procedure table of claim 6, wherein said display is configured to continuously display the weight of a first load sensed by said sensor, regardless of changes to the first load.

9. The veterinary procedure table of claim 6, wherein said at least one sensor senses a load disposed on said animal support regardless of the elevation of said animal support.

10. A veterinary procedure table, comprising:
    a vertically extending frame having a front surface; and
    an animal support having first and second spaced ends defining a lengthwise dimension, and having first and second spaced sides defining a widthwise dimension, said first end defining a terminal edge along said widthwise dimension, said lengthwise dimension being greater than said widthwise dimension;
    said animal support slidably coupled to said frame only at said first end such that said animal support is cantilevered from said frame, with said terminal edge of said first end confronting said front surface of said frame and said second end extending outwardly from said frame such that a longitudinal centerline of said animal support is perpendicular to said front surface, and such that said animal support is movable from a first position adjacent a floor surface to a plurality of elevations relative to said frame and spaced from the floor surface;
    a sink associated with said animal support and adapted to receive fluid material from said animal support;
    at least one sensor associated with said animal support and operative to sense a load disposed on said animal support;
    a display communicating with said sensor and operative to indicate a weight associated with the load sensed by said sensor;
    wherein said animal support comprises first and second support arms extending generally along a direction corresponding to said lengthwise dimension of said animal support, and wherein said sink is removably received on said first and second support arms; and
    wherein said sensor is disposed between one of said first and second support arms and said sink.

11. The veterinary procedure table of claim 10, further comprising a resilient member disposed between said sensor and said sink.

12. The veterinary procedure table of claim 11, further comprising:
a pin on said sink; and
an aperture in said resilient member;
said aperture receiving said pin to facilitate positioning said sink in registration with said first and second support arms.

13. The veterinary procedure table of claim 12, further comprising:
a flange on said sink, said flange cooperating with said first and second support arms to position said sink in registration with said first and second support arms.

14. A veterinary procedure table, comprising:
a vertically extending frame having a front surface;
an animal support frame cantilevered from and slidably coupled to said vertically extending frame for movement between a first position adjacent a floor surface and a plurality of elevations relative to said vertically extending frame and spaced from the floor surface;
a sink removably received on said animal support frame, said sink having first and second spaced ends defining a lengthwise dimension, and having first and second spaced sides defining a widthwise dimension, said first end defining a terminal edge along said widthwise dimension and confronting said front surface of said vertically extending frame such that a longitudinal centerline of said sink is perpendicular to said front surface, said lengthwise dimension being greater than said widthwise dimension;
said sink including a bottom wall, at least one sidewall extending upwardly from said bottom wall and cooperating with said bottom wall to define a reservoir, and an aperture in said bottom wall for draining fluids received in said reservoir;
first registration structure on said animal support frame;
second registration structure on said sink and shaped complementary to said first registration structure, said second registration structure cooperating with said first registration structure to position said sink in registration on said animal support frame;
a grille disposed directly above said sink for supporting an animal thereon;
at least one sensor operative to sense a load disposed on said grille; and
a display communicating with said sensor and operative to indicate a weight associated with the load sensed by said sensor.

15. The veterinary procedure table of claim 14, wherein said first registration structure comprises an aperture associated with said animal support frame, and said second registration structure comprises a pin on said sink, said pin received in said aperture to position said sink in registration on said animal support frame.

16. The veterinary procedure table of claim 14, wherein said sensor is disposed on said animal support frame, the veterinary procedure table further comprising a resilient member disposed between said sensor and said sink.

17. The veterinary procedure table of claim 16, wherein said first registration structure comprises an aperture in said resilient member, and said second registration structure comprises a pin on said sink, said pin received in said aperture to position said sink in registration on said animal support frame.

18. The veterinary procedure table of claim 14, wherein said first registration structure comprises an arm of said animal support frame, and said second registration structure comprises a flange on said sink.

19. The veterinary procedure table of claim 14, wherein said animal support frame is coupled to said vertically extending frame such that said animal support frame is fixed in a substantially horizontal orientation relative to said vertically extending frame while being movable to said plurality of elevations.

* * * * *